Sept. 10, 1929.   E. J. HALL   1727,824
VENTILATING MEANS FOR MOTOR VEHICLES
Filed Sept. 13, 1928

INVENTOR
Elbert J. Hall
BY F. H. Gibbs
ATTORNEY

Patented Sept. 10, 1929.

1,727,824

UNITED STATES PATENT OFFICE.

ELBERT J. HALL, OF DETROIT, MICHIGAN, ASSIGNOR TO AMERICAN CAR AND FOUNDRY MOTORS COMPANY, OF NEW YORK, N. Y., A CORPORATION OF DELAWARE.

VENTILATING MEANS FOR MOTOR VEHICLES.

Application filed September 13, 1928. Serial No. 305,631.

This invention relates generally to motor vehicles, such as motor buses or the like and has particular reference to ventilating means therefor.

One object of the present invention is the provision of means arranged below the floor of a vehicle for directing air into the passenger compartment of the vehicle.

Another object of the invention is the provision of a plate or the like arranged below the vehicle floor which forms, in effect, a compartment for receiving air to be directed into the passenger compartment of the vehicle.

A further object of the invention is the provision of means arranged adjacent the usual radiator fan for directing air accelerated by said fan into the passenger compartment of a vehicle at a pressure above atmospheric.

Figure 1:
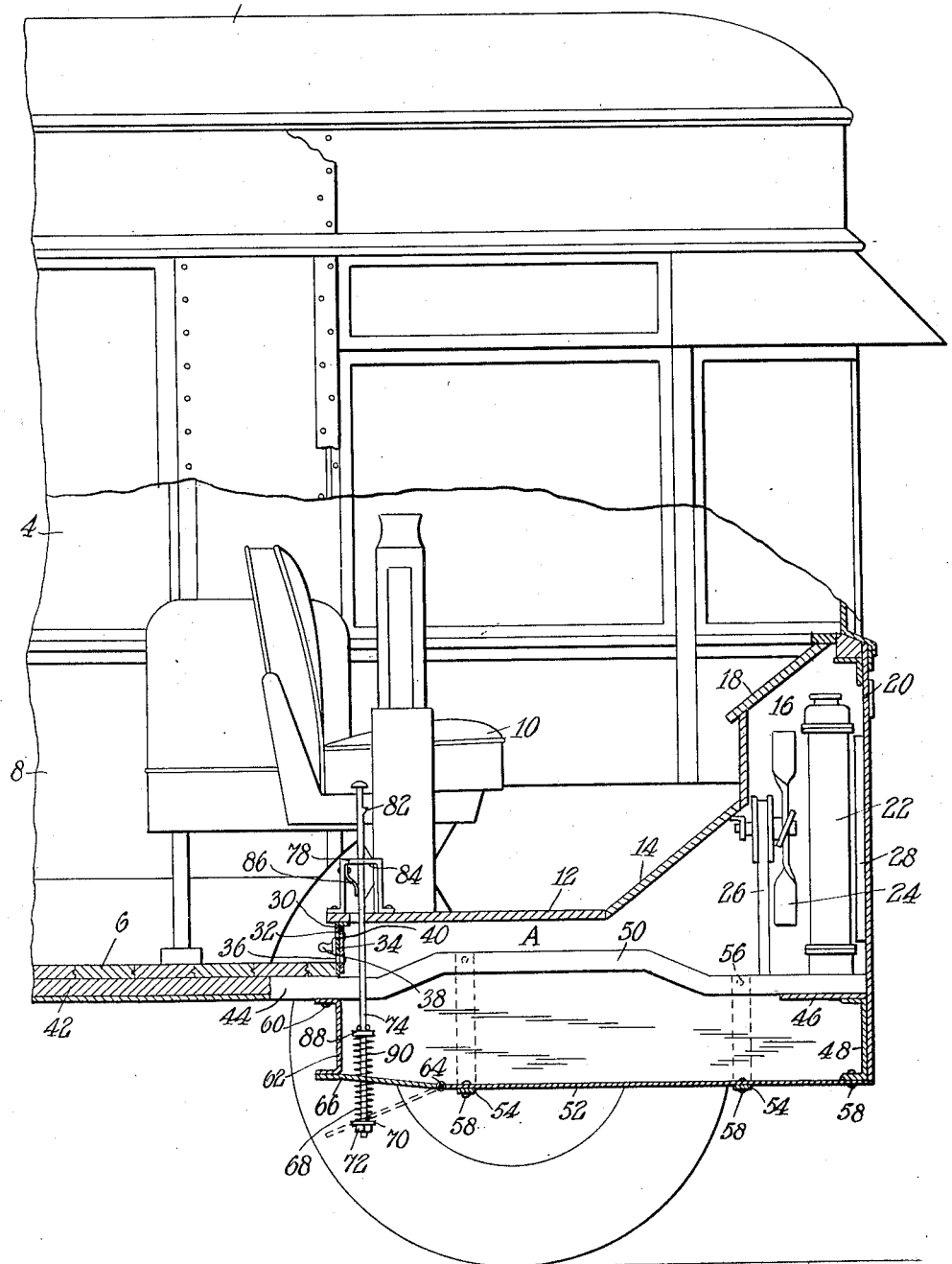
Figure 2:
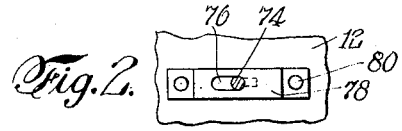

Other objects and advantages of this invention will be apparent from the following description taken in conjunction with the accompanying drawings in which:

Figure 1 is a side elevation of the front end of a vehicle, certain parts being broken away to disclose the interior of the vehicle and other parts being shown in section; and Fig. 2 is a top plan view of the lever bracket.

Referring now more particularly to the drawings, Fig. 1 discloses the front end of a bus having a roof 2, sides 4, a floor 6 and walls 8, one only of the latter being shown. The vehicle is provided with a driver's seat 10 secured to a raised platform 12, the forward end of which terminates in a toe board 14.

The vehicle shown is of the type now known as a street car type bus and has a compartment 16 therein defined by the instrument board 18 and the end sheet 20, in which compartment is mounted in any suitable manner a radiator 22 and a fan 24, the latter actuated from the vehicle engine (not shown) by the belt 26. The end sheet 20 is provided with vertical louvres 28 to admit air into the compartment 16 through the radiator and beneath the platform and toe board, as will be apparent.

The platform is elevated above the floor and the end thereof is supported by a riser 30 which is provided with a plurality of openings 32. Secured to the riser and movable relative thereto is a shutter 34 having apertures 36 therein adapted to register with the before-mentioned openings 32 of the riser, and for moving the shutter 34 a handle 38 is provided. Secured to the shutter is a screen 40 or the like for preventing passage of dirt or other foreign matter into the passenger compartment.

The floor 6 is secured to nailing strip 42 seated in spaced channels 44 which extend to the end sheet 20 and are secured to a plate 46 carried by the channel end sill 48. The extended ends of the channels 44 have been designated as 50 for purposes of convenience, and these ends support a plate 52 by means of straps 54 riveted as at 56 to the said ends; it being understood, of course, that more than one channel is provided and any required number of channels may be utilized, the straps extending from one to the other and supporting the plate 52 as clearly shown in Fig. 1, the plate being preferably of approximately the same width as the radiator 22. The plate 52 underlies the lower chord of the end sill 48 and is secured thereto and to the straps 54 by suitable fasteners, such as the rivets 58; the plate defining with the platform and toe board an open sided compartment A.

Connecting spaced channels 44 and riveted thereto as at 60, is a channel 62 which defines one end closure for a compartment A, the opposite end being closed by the end sheet 20 and the end sill 48.

Hingedly connected to the inner or rear end of plate 52 at 64 is a shutter 66, the free end of which underlies the lower chord of channel 62 and is normally retained in engagement therewith by a coil spring 68 supported on a seat 70 carried by a nut 72 secured to the lower end of an operating lever 74. The operating lever extends through the shutter 66 and upwardly through platform 12 adjacent the driver's seat, and the upper end of the lever is arranged through an elongated aperture 76 in a U-shaped bracket 78 secured by bolts 80 to the platform, and said upper end is provided with an integral latch element 82 adapted to engage the undersurface of portion 84 of the bracket when the lever is depressed to open shutter 66. For retaining the lever in latched position, a spring 86 is provided which is secured to the bracket and which normally urges the lever in an obvious manner.

Above the shutter 66 the lever is provided with an annular shoulder 88 serving as a seat for a coil spring 90, the other end of which rests on the shutter 66.

With the device of the present invention assembled as shown in full lines in Fig. 1, it will be apparent that upon operation of the fan 24, the air which is drawn in through the louvres 28 of the end sheet 20 will pass through the compartment A and will be forced through the alined openings in the shutters 30 and 34 into the passenger compartment; the amount of air passing into the passenger compartment being, of course, regulated by any desired adjustment of the shutter 34 with respect to the riser 30. When it is desired to permit the air to pass directly from the chamber A into the atmosphere, the lever 74 is depressed until the latch element is engaged beneath the undersurface of portion 84 of the bracket, and when the lever is depressed it will be apparent that the shutter 66 will be forced to the position shown in dotted lines in Fig. 1, thereby opening the compartment A to the atmosphere and permitting a direct passage of the air which has been drawn in by the fan to the atmosphere.

The drawings herein disclose one embodiment of the present invention, said embodiment including the provision of a plate supported by the floor supporting channels and in a plane below the floor, the floor of the vehicle comprising both the platform 12 and the floor boards 6 of the passenger compartment, but it is to be understood that the invention shown and described herein is susceptible of various modifications, and the drawings are for illustrative purposes only.

As before mentioned, the drawings disclose one embodiment of the invention, but it is to be understood that these drawings are for illustrative purposes only and that various changes in the form and proportions of the device may be made within the scope of the appended claims without departing from the spirit of the invention.

What is claimed is:

1. In a vehicle, a passenger compartment having a floor, a driver's compartment having a floor arranged in a horizontal plane above that of the passenger compartment floor, a riser connecting adjacent ends of the two floors, a shutter in said riser, a plate supported below the floor of the driver's compartment and defining a space for receiving air from the front of the vehicle, a channel extending transversely across the vehicle, a shutter secured to the end of the plate and normally engaging the channel, and an operating lever connected to said second named shutter for varying the position of the latter whereby air from the front of the vehicle is permitted to pass to the atmosphere or into the passenger compartment as desired.

2. In a vehicle body having an end sill, a cooling fan, longitudinal channels, a passenger compartment, a floor therefor, and a driver's platform arranged above the floor level, a riser connecting adjacent ends of the floor and platform and provided with means for admitting air into the passenger compartment, a plate supported by said channels below the driver's platform and secured to the end sill, a transverse channel secured to the longitudinal channels to define the rear end closure of an open sided compartment formed by said plate and end sill, a shutter hinged to the plate and normally engaging the transverse channel, and an operating lever for the shutter to vary the position thereof whereby air forced into the open sided compartment may be directed to the atmosphere or into the passenger compartment as desired.

3. In a motor vehicle, an end sill, a sheathing secured thereto and provided with louvres, a fan adjacent the sheathing, a floor for the vehicle, channels supporting the floor, and means for passing air drawn by said fan into the vehicle comprising a plate secured to the end sill and supported by the channels below the floor level, and a ventilator in the floor, said plate being adapted to retard passage of the air to the atmosphere whereby some thereof is passed through the ventilator into the vehicle.

In witness whereof I have hereunto set my hand.

ELBERT J. HALL.